United States Patent
Nazarov (10) Patent No.: US 8,149,537 B2
(45) Date of Patent: Apr. 3, 2012

(54) MAGNETIC WRITER WITH MULTI-COMPONENT SHIELD

(75) Inventor: Alexey Nazarov, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 400 days.

(21) Appl. No.: 12/489,243

(22) Filed: Jun. 22, 2009

(65) Prior Publication Data

US 2010/0321825 A1 Dec. 23, 2010

(51) Int. Cl.
*G11B 5/127* (2006.01)
*G11B 5/31* (2006.01)

(52) U.S. Cl. ..................... 360/125.3; 360/319

(58) Field of Classification Search ............... 360/128, 360/319, 125.02–125.32
See application file for complete search history.

(56) References Cited

U.S. PATENT DOCUMENTS

| | | | |
|---|---|---|---|
| 4,907,113 A | 3/1990 | Mallary | |
| 5,075,956 A * | 12/1991 | Das | 29/603.14 |
| 6,809,899 B1 * | 10/2004 | Chen et al. | 360/125.13 |
| 6,954,340 B2 | 10/2005 | Shukh et al. | |
| 7,031,121 B2 | 4/2006 | Khera et al. | |
| 7,070,698 B2 * | 7/2006 | Le | 216/22 |
| 7,075,756 B1 | 7/2006 | Mallary et al. | |
| 7,193,815 B1 | 3/2007 | Stoev et al. | |
| 7,221,539 B2 | 5/2007 | Takano et al. | |
| 7,227,720 B2 * | 6/2007 | Sasaki et al. | 360/125.12 |
| 7,233,457 B2 | 6/2007 | Johnston et al. | |
| 7,268,974 B2 * | 9/2007 | Lille | 360/125.06 |
| 7,307,815 B2 | 12/2007 | Han et al. | |
| 7,322,095 B2 | 1/2008 | Guan et al. | |
| 7,337,530 B1 | 3/2008 | Stoev et al. | |
| 7,394,620 B2 * | 7/2008 | Taguchi | 360/125.03 |
| 7,551,396 B2 * | 6/2009 | Hsu et al. | 360/125.3 |
| 7,639,454 B2 * | 12/2009 | Lim et al. | 360/125.3 |
| 7,649,712 B2 * | 1/2010 | Le et al. | 360/125.3 |
| 7,715,152 B2 * | 5/2010 | Okada et al. | 360/319 |
| 7,969,684 B2 * | 6/2011 | Le et al. | 360/125.3 |
| 7,983,002 B2 * | 7/2011 | Pust et al. | 360/125.04 |
| 8,000,059 B2 * | 8/2011 | Jiang et al. | 360/125.3 |
| 2004/0212923 A1 * | 10/2004 | Taguchi | 360/125 |
| 2005/0259357 A1 | 11/2005 | Kameda | |
| 2006/0044682 A1 * | 3/2006 | Le et al. | 360/126 |
| 2006/0092564 A1 * | 5/2006 | Le | 360/126 |
| 2006/0139801 A1 | 6/2006 | Kamada | |
| 2006/0227463 A1 | 10/2006 | Wright et al. | |
| 2006/0245109 A1 * | 11/2006 | Hsu et al. | 360/126 |
| 2007/0025018 A1 * | 2/2007 | Lim et al. | 360/125 |
| 2007/0035878 A1 * | 2/2007 | Guthrie et al. | 360/125 |
| 2007/0035885 A1 * | 2/2007 | Im et al. | 360/317 |
| 2007/0041127 A1 | 2/2007 | Kameda et al. | |
| 2007/0064343 A1 | 3/2007 | Yazawa et al. | |
| 2007/0115584 A1 * | 5/2007 | Balamane et al. | 360/126 |
| 2007/0139819 A1 | 6/2007 | Yazawa et al. | |

(Continued)

*Primary Examiner* — Will J Klimowicz
(74) *Attorney, Agent, or Firm* — Hall, Estill Attorneys at Law (57) ABSTRACT

A writer comprises a main pole, a write gap and a write shield. The main pole has a main pole tip for emitting magnetic flux. The write gap is adjacent the main pole tip along a center axis of the writer. The write shield is spaced from the main pole tip by the write gap. The write shield comprises a first component located above the main pole tip along the center axis and a second component having different magnetic properties from the first component. The second component extends perpendicularly to the center axis from opposing sides of the first component.

20 Claims, 5 Drawing Sheets

U.S. PATENT DOCUMENTS

| | | |
|---|---|---|
| 2008/0186636 A1 | 8/2008 | Amin et al. |
| 2008/0225442 A1* | 9/2008 | Hirose et al. .................. 360/319 |
| 2008/0316652 A1* | 12/2008 | Bonhote et al. ............... 360/319 |
| 2009/0168240 A1* | 7/2009 | Hsiao et al. .............. 360/125.02 |
| 2010/0188783 A1* | 7/2010 | Taguchi ........................ 360/319 |
| 2011/0205671 A1* | 8/2011 | Benakli et al. ................ 360/319 |

* cited by examiner

MAGNETIC WRITER WITH MULTI-COMPONENT SHIELD

SUMMARY

Various embodiments may have a magnetic writer and a magnetic transducer using the writer. In some such embodiments, the writer has a main pole, a write gap and a write shield. The main pole is formed into a main pole tip for emitting magnetic flux perpendicular to a center axis of the writer. The write gap is formed in a nonmagnetic spacer material located adjacent the main pole tip, which spaces the write shield from the main pole tip along the center axis.

Further in some example embodiments, the write shield comprises a first component and a second component having different magnetic properties from the first component. The first component is formed above the main pole tip along the center axis. The second component extends perpendicularly to the center axis from opposing sides of the first component.

DETAILED DESCRIPTION

Figure 1:
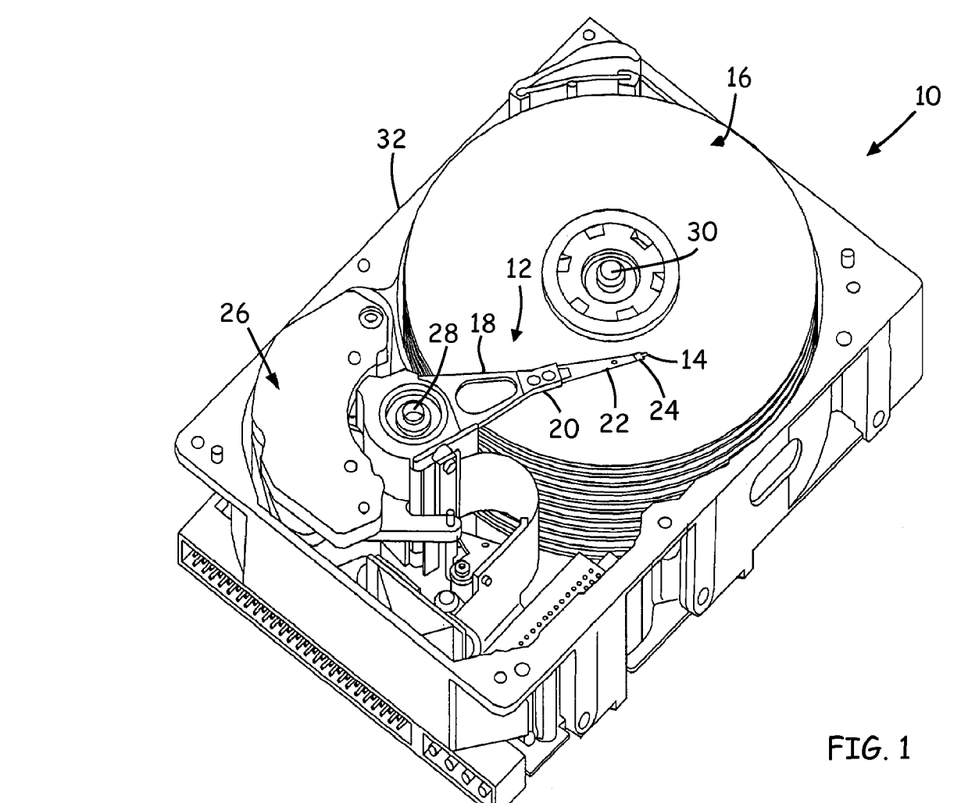
FIG. 1 is a perspective view of a magnetic recording system with an actuator for positioning a magnetic transducer or read/write head on a slider.

FIG. 1 is a perspective view of magnetic recording system 10. In this particular embodiment, system 10 comprises a disc drive with actuator assembly 12 for positioning a magnetic transducer on slider 14 over magnetic medium 16. The magnetic transducer has a multi-component write shield for reducing field curvature, as described in more detail below with respect to FIG. 2.

Actuator 12, in the example embodiment of FIG. 1, comprises actuator arm 18 and a suspension with baseplate/mounting block 20, load beam 22 and flexure 24. The load beam 22 is connected to actuator arm 18 at baseplate/mounting block 20, and supports slider 14 on flexure 24. Voice coil motor 26 rotates actuator arm 18 about spindle axis 28, positioning the slider 14 with respect to magnetic medium 16.

In the embodiment of FIG. 1, magnetic medium 16 comprises a disc, or a stack of parallel coaxial discs. In operation of system 10, the disc or disc stack rotates about spindle 30 within housing 32, translating magnetic medium 16 with respect to slider 14. Actuator assembly 12 positions slider 14 over magnetic medium 16, allowing the magnetic transducer to perform read and write functions for system 10.

The magnetic transducer on slider 14 writes magnetic data in the form of bits, which are defined by regions of a particular magnetic orientation in medium 16. The bit length is defined along the tracking direction, and determines the linear bit density (typically in bits per inch or BPI, or in metric units such as bits/cm). The crosstrack dimension is characterized as the write-plus-erase width (WPE), which has the write width WW and erase bands on either side, and which determines the linear track density (in tracks per inch or TPI, or in tracks/cm). The areal density then is the product of linear densities TPI and BPI (that is, in bits per square inch or bits/cm$^2$).

Slider 14 utilizes one or more a magnetic transducers with a multi-component write shield, which increases the attainable areal density by reducing magnetic field curvature across the bit pattern. This reduces the relative size of the erase bands on either side of the write width (WW), increasing the maximum potential TPI. The multi-component write shield also produces a more regular write bubble, with less curvature and a more rectangular structure. Such configuration improves the packing ratio, increasing the maximum potential BPI and areal density.

Figure 2:
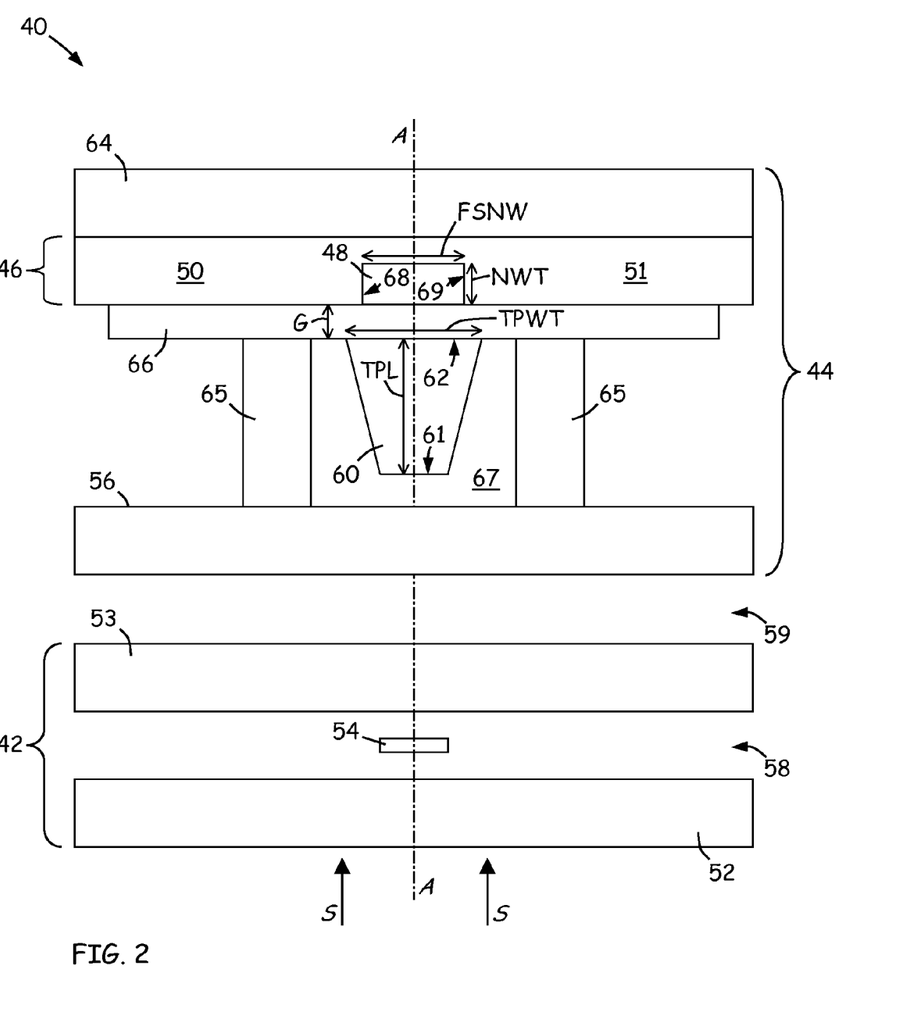
FIG. 2 is an external surface view of a magnetic transducer on the slider in FIG. 1.

FIG. 2 is an external surface view of an example magnetic transducer 40 for slider 14 of FIG. 1. In this embodiment, magnetic transducer 40 utilizes a stacked read/write head configuration, comprising reader 42 and perpendicular writer 44 with multi-component write shield 46. FIG. 2 shows the external media-facing surface of exemplary magnetic transducer 40, which faces a magnetic medium oriented substantially parallel to and above the plane of the figure (see, e.g., FIG. 3).

Reader 42 comprises first (bottom) read shield 52, second (top) read shield 53 and reader element 54. In some embodiments, the reader element 54 is located in read gap 58 between read shields 52 and 53, which protects the shield reader element 54 from stray magnetic flux.

Reader element 54 reads magnetic data (bits) along tracking direction S by responding to the magnetic domain orientation in the recording layer of the medium, where the response is based on a magnetoresistive effect such as giant magnetoresistance (GMR) or tunneling magnetoresistance (TMR). In the particular embodiment of FIG. 2, for example, reader element 54 comprises a GMR element or spin valve, and is spaced from shields 52 and 54 by read gap material 58. Alternatively, reader element 54 extends across read gap 58 to contact one or both of shields 52 and 54.

As shown in an example embodiment, writer 44 comprises first return pole 56 and a write pole (or main pole) shaped into main pole tip 60 with leading edge 61 and trailing edge 62. Main pole tip 60 is oriented toward the media-facing surface of magnetic transducer 40, and is shielded by multi-component write shield 46 located above trailing edge 62. In some embodiments, writer 44 also comprises second (or trailing) return pole 64, and in further embodiments writer 44 has side shields 65.

While not required or limited, perpendicular writer 44 is spaced from reader 42 by nonmagnetic layer 59. In merged transducer configuration embodiments, nonmagnetic layer 59 is absent and top read shield 53 also functions as first (or leading) return pole 56 for write pole 60.

Leading edge 61 and trailing edge 62 of main pole tip 60 are defined in terms of tracking direction S, with magnetic media translation from the bottom to the top of magnetic transducer 40 and writer 44. Magnetic bits are laid down onto the media along main pole trailing edge 62, where the magnetic domains reflect the magnitude and polarity of the flux as the medium passes out of the footprint of main pole tip 60.

In the particular embodiment of FIG. 2, main pole tip 60 is trapezoidal with leading edge 61 tapering toward generally parallel trailing edge 62. In this embodiment, the top pole width at trailing edge 62 (TPWT) is defined in a crosstrack or transverse direction with respect to tracking direction S (that is, perpendicular to center axis A), and the top pole length (TPL) is measured along tracking direction S, from leading edge 61 to trailing edge 62 (that is, parallel to center axis A). Alternatively, main pole tip 60 has a rectangular (untapered)

shape, or a more irregular cross section, with transverse (crosstrack) and axial (trackwise) dimensions redefined accordingly.

As shown in FIG. 2, multi-component write shield 46 is a trailing write shield, spaced above trailing edge 62 of main pole tip 60 by write gap material 66. In some designs, multi-component write shield 46 is also referred to as a front shield for main pole tip 60.

Write gap layer 66 spaces trailing edge 62 of main pole tip 60 from multi-component shield 46, and is formed of a non-magnetic spacer material to reduce flux couplings. Write gap layer 66 defines write gap G along tracking direction S, parallel to center axis A. Additional non-magnetic material 67 spaces the main pole tip 60 from first return pole 56, and, depending on configuration, from one or more side shields 65.

In some embodiments, the first (center) component 48 of multi-component shield 46 is spaced directly above main pole tip 60 by write gap layer 66, along center axis A. The transverse width of first shield component 48 is characterized as the front shield notch width (FSNW), transverse to tracking direction S and perpendicular to center axis A. The axial length of first shield component 48 (NWT) is defined along tracking direction S, parallel to center axis A.

The second (left and right) shield components 50, 51 of multi-component write shield 46 are located adjacent first (center) shield component 48. Such configuration can be complemented by the first shield component 48 which spaces the second shield components 50, 51 in a transverse (crosstrack) direction from center axis A, at least along axial length NWT. The second components 50, 51 extend from opposing side 68, 69 of first component 48, transverse to tracking direction S and perpendicular to center axis A. In various embodiments, first (center) and second (left and right) shield components 48, 50 and 51 are symmetrically arranged about center axis A, but in some embodiments the arrangement is asymmetric.

As shown in FIG. 2, second (left and right) shield components 50, 51 extend behind center shield component 48, opposite write gap material 66. In this embodiment, each of second components 50 and 51 typically comprise the same material, forming a unitary second shield component, with first and second (left and right) sides connecting above center component 48. Alternatively, the first component 48 divides second components 50 and 51 into separate left and right sections, resulting in a multi-piece trailing write shield structure with distinct left, center and right pieces (see, e.g., FIG. 5).

The second shield components 50, 51, in the embodiment generally illustrated in FIG. 2, have different magnetic properties from first shield component 48. In some embodiments, for example, first component 48 is formed of a nonmagnetic material and second components 50, 51 are formed of magnetic materials, such that first component 48 forms a nonmagnetic notch or gap in multi-component write shield 46.

In some of these embodiments, first (center) shield component 48 and write gap layer 66 are comprised of the same materials, but the notch or gap formed by first shield component 48 is nonetheless structurally and functionally distinct from write gap layer 66. In particular, write gap layer 66 spaces the multi-component write pole shield 46 from trailing edge 62 of the main pole tip 60 in a trackwise direction, while first shield component 48 spaces the second shield components 50, 51 (or portions thereof) from center axis A in a crosstrack direction.

From a functional perspective, write gap layer 66 reduces magnetic flux connections to main pole tip 60, while first shield component 48 shapes the field within write gap layer 66, in order to reduce field curvature along trailing edge 62 of main pole tip 60. Field shaping is determined by the geometry and composition of first shield component 48 and second shield components 50, 51, relative to the other elements of writer 44. In particular, the different magnetic properties of first shield component 48 and second shield component 50, 51 are selected to reduce field curvature and increase the attainable storage density, while retaining sufficient effective field strength and gradient to define a readable bit pattern.

Figure 3:
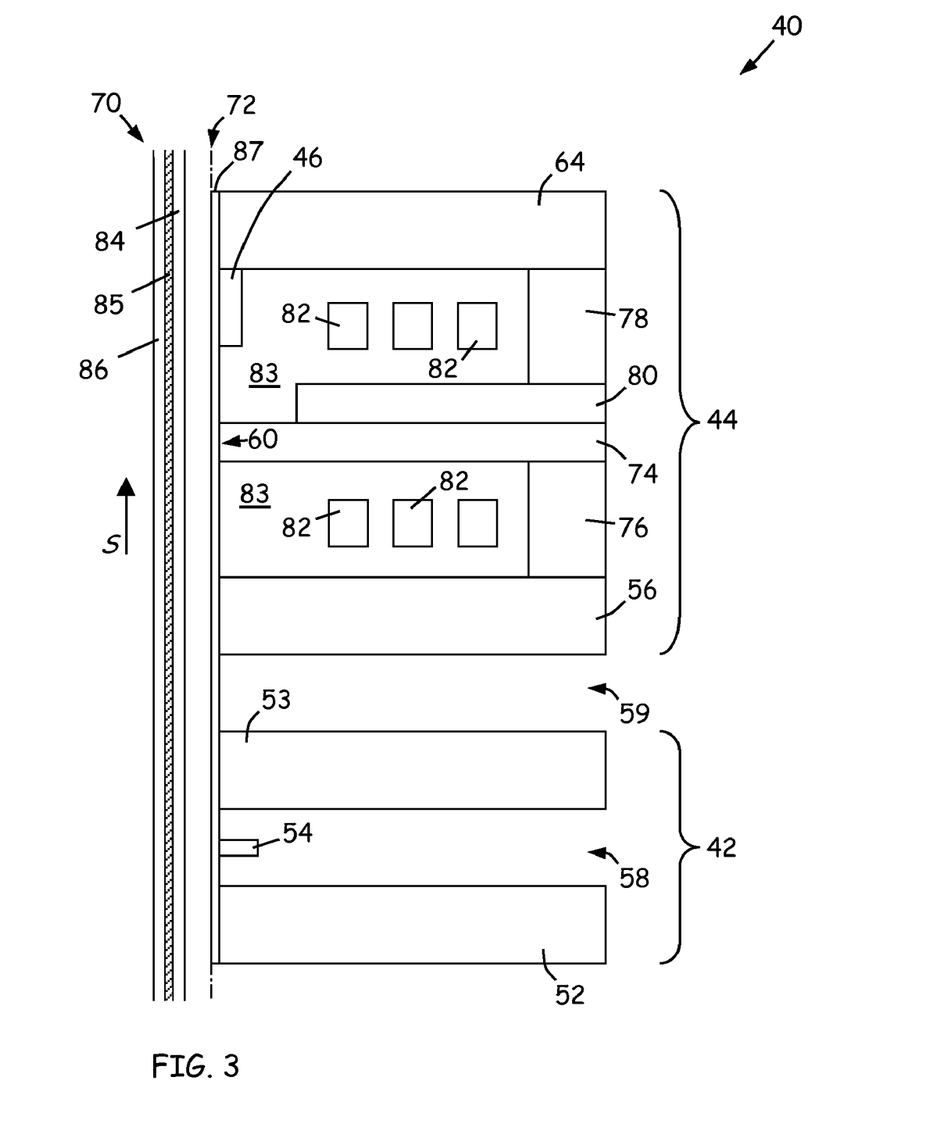
FIG. 3 is a cross-sectional view of the magnetic transducer in FIG. 2.

FIG. 3 is a cross-sectional view of the exemplary magnetic transducer 40, taken along center axis A of FIG. 2. Magnetic transducer 40 comprises a reader 42 and perpendicular writer 44 with multi-component trailing write shield 46. Magnetic transducer 40 and writer 44 face magnetic medium 70 along external (media-facing) surface 72.

The reader 42 comprises at least a bottom read shield 52, top read shield 53 and reader element 54, as described above. In merged configuration embodiments, top read shield 53 also serves as first return pole 56 for writer 44.

The perpendicular writer 44 comprises first return pole 56, main pole 74, multi-component write shield 46 and, in some embodiments, side shields (not shown) and second (trailing) return pole 64, as described above. Main pole (write pole) 74 has a proximal (media-facing) end defined at main pole tip 60. Typical embodiments of writer 44 also may comprise back vias 76 and 78, yoke 80 and one or more sets of coils 82 with insulating layers 83.

Medium 70 translates in tracking direction S with respect to magnetic transducer 40 and writer 44. In the particular embodiment of FIG. 3, magnetic medium 70 comprises top recording layer 84, interlayer 85 and soft underlayer (SUL) 86. Recording layer 84 is formed of a magnetically hard, high coercivity material such as an iron oxide, a cobalt alloy or another ferromagnetic material, or a multilayer Co/Pd material with various additives including Cr, Pt, B, Ta and Nb. In various embodiments, the interlayer 85 is formed of nonmagnetic material, such as a dielectric or nonmagnetic oxide, while the SUL 86 is formed of a magnetically soft material with high magnetic permeability, typically CoFe, FeAlN and alloys thereof, or NiFe, CoZrNb, FeTaN and alloys thereof.

The coils 82 are formed, in some non-limiting embodiments, of a low resistivity material such as Cu, and generate time-varying magnetic flux when energized by a switching write current. Insulating layers 83 are formed of a high resistivity material such as a dielectric, in order to electrically insulate coils 82. In some embodiments, insulating layers 83 are formed of the same or similar materials as write gap layer 66 and nonmagnetic spacers 58, 59 and 67, as shown in FIG. 2. In other embodiments, insulating layers 83 are formed of different materials.

Yoke 80 is formed of a magnetically soft material such as NiFe, in order to improve flux delivery to main pole 74. The main pole 74 is formed of a magnetically soft material with high magnetic moment, such as CoFe, in order to direct the magnetic flux through main pole tip 60 for perpendicular write operations onto magnetic medium 70.

Return poles 56, 64 and back vias 76, 78 are formed, in a variety of non-limiting embodiments, of magnetically soft materials such as NiFe, in order to close flux loops from main pole tip 60 through yoke 80 and main pole 74. First back via 76, for example, forms a flux connection between the distal (non media-facing) ends of first return pole 56 and main pole 74. The second back via 78 forms a flux connection between the distal ends of second return pole 64 and yoke 80.

In some embodiments, reader element 54, main pole tip 60 and other elements of magnetic transducer 40 are provided with protective coating 87 at external surface 72. Various protective coatings, such as encapsulants, diamond-like coatings (DLCs) and combinations thereof, which protect magnetic transducer 40 and reduce hard particle contamination of magnetic medium 70. In coated embodiments, main pole tip 60 and the proximal (media-facing) end of reader element 54 are spaced from external surface 72 by the coating width. In uncoated embodiments, main pole tip 60 and the media-facing end of reader element 54 are defined along external surface 72.

In perpendicular embodiments of writer 44, magnetic flux loops from main pole tip 60 cross external surface 72 to enter top recording layer 84 of magnetic medium 70 in a substantially perpendicular sense. The flux loops cross interlayer 85 and spread out along bottom layer (SUL) 86, reducing field intensity in order to reduce the tendency for rewriting and erasure when the loops close back across recording layer 84 to return poles 56 and 64. Alternatively, flux enters recording layer 84 in a substantially parallel sense, and interlayer 85 and SUL 86 are sometimes absent.

As displayed in the embodiment of FIG. 3, multi-component write shield 46 is configured to reduce field curvature proximate main pole tip 60 when writer 44 writes data to magnetic medium 70. Reduced field curvature is reflected in a modified write bubble structure, and in particular by an increased ratio of write width WW to write-plus-erase width WPE. Multi-component write shield 46 thus increases the attainable storage density of writer 44 and magnetic transducer 40, as described below.

Figure 4:
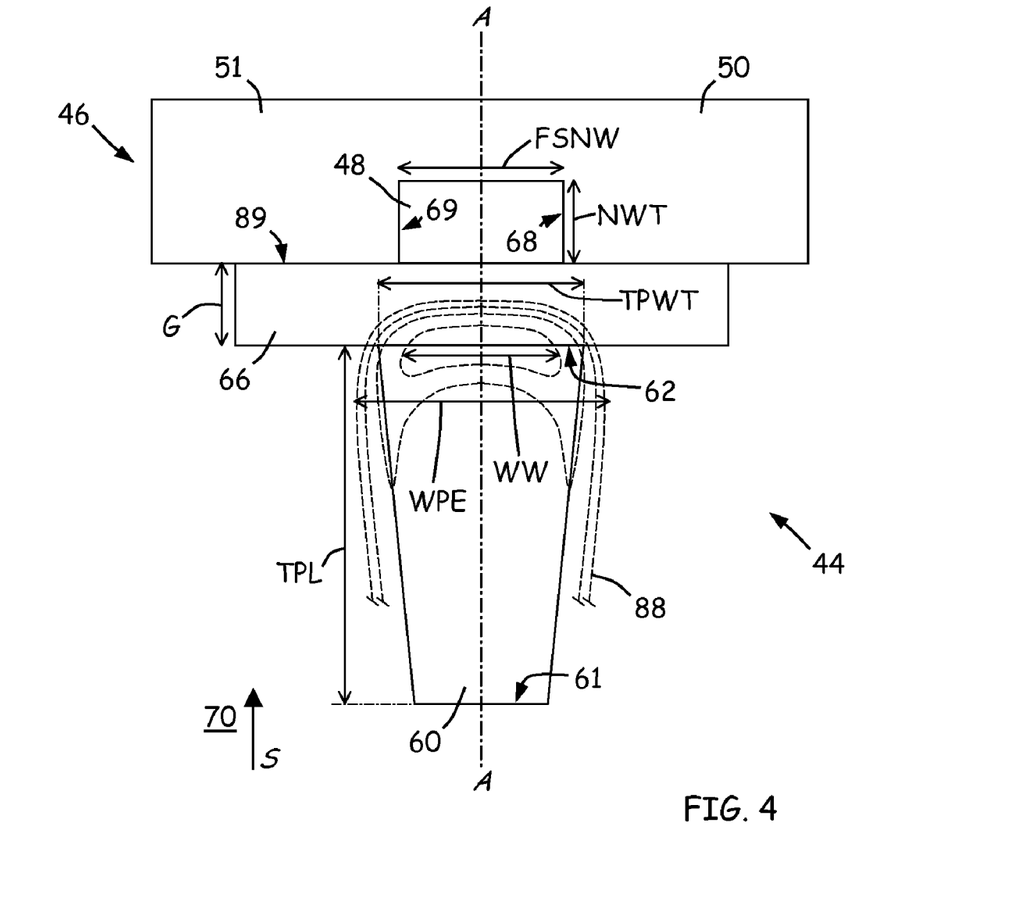
FIG. 4 is a schematic illustration of a write bubble structure produced by the magnetic transducer in FIG. 2.

FIG. 4 is a schematic diagram illustrating the example write bubble structure for perpendicular writer 44 of magnetic transducer 40, as shown in FIGS. 2 and 3 (above) and in FIG. 5 (below). FIG. 4 is taken in a plane parallel to external media-facing surface 72 of FIG. 3, looking down at magnetic medium 70 with tracking direction S from leading edge 61 to trailing edge 62 of main pole tip 60.

The write bubble structure or "footprint" is illustrated by effective field strength (flux) contours 88, which shown field curvature in the region proximate main pole trailing edge 62, where data are recorded onto magnetic medium 70. The flux contours at main pole leading edge 61 are not shown.

Multi-component write shield 46, as shown, is spaced above main pole tip 60 along tracking direction S, with leading edge 89 of multi-component write shield 46 separated from trailing edge 62 of main pole tip 60 by write gap G. First (center) shield component 48 is located directly above main pole tip 60 along center axis A, extending across leading edge 89 of multi-component shield 46 with transverse width FSNW, and extending along center axis A with axial length NWT.

The position of the center component 48 of multi-component shield 46 spaces side components 50 and 51 from center axis A at leading edge 89, with side components 50, 51 extending transversely from opposing sides 68, 69 of center component 48. In this particular embodiment, side components 50 and 51 also extend behind center component 48, such that nonmagnetic component 48 forms a notch in magnetic components 50 and 51. The notch has axial length NWT along center axis A, and extends transversely along leading edge 89 of multi-component shield 46 as shown in FIG. 2, above. Note, however, that in the media-facing orientation of FIG. 4, perpendicular writer 44 is reflected about center axis A with respect to FIG. 2. This reverses the left-right orientation of side components 50 and 51, and switches opposing sides 68 and 69 of center component 48.

Such a multi-component write pole shield 46 reduces field curvature in the write bubble of perpendicular writer 44, particularly along trailing edge 62 of main pole tip 60. Curvature reduction decreases the transverse width of the erase bands relative to write width WW (the useful bit width), reducing ratio R of write width WW to full write-plus-erase width WPE:

$$R = \frac{WW}{WPE}. \quad [1]$$

Where ratio R is measured in percent and defined at a particular flux contour, for example at an effective field strength of about 10-12 kOe (for instance, at H≈10 kOe). Increasing R decreases the minimum track spacing transverse to tracking direction S, and increases the maximum attainable TPI.

Curvature reduction also increases the flatness of flux contours 88 across write width WW, including the write gap region between trailing edge 62 of main pole tip 60 and leading edge 89 of multi-component write shield 46. This configuration produces a more regular and rectangular bit structure across write width WW, decreasing the minimum bit spacing along tracking direction S, and increasing the maximum attainable BPI.

Each of these effects increases the maximum bit packing fraction and data storage density. Magnetic field effects are often unpredictable, however, and the operational benefits depend upon a detailed relationship between multi-component shield 46 and the associated elements of perpendicular writer 44. In particular, the benefits of multi-component shield 46 depend upon the particular geometry of shield components 48, 50 and 51 with respect to main pole tip 60.

In some baseline designs, main pole tip 60 is formed with trailing edge width TPWT of about 80 nm and axial length TPL of about 200 nm. In such embodiments, the trailing edge shield is formed of a single-component material, with write gap G of about 45 nm. Write currents varied between relatively low and relatively high values on the order of 10-100 mA, depending upon writer configuration. With relatively low write currents, for example, write width WW varied from about 54 to about 64 nm and write-plus erase width WPE varied from about 75-100 nm, with ratio R in the range of about 62-72%.

In embodiments of the present design, multi-component shield 46 is formed with nonmagnetic spacer 66 having a transverse width between about half the trailing pole width and the full trailing pole width (½ TPWT≦FSNW≦TPWT), and an axial length about equal to the write gap or larger (TNW≧G, where G≦50 nm). This increases ratio R, allowing write-plus-erase width WPE to be decreased without a commensurate increase in write width WW; or, conversely, allowing write width (WW) to be increased without a commensurate increase in write-plus-erase width WPE (see Eq. 1).

The multi-component write shield 46 also allows the main pole trailing edge width (TPWT) to be reduced without substantially decreasing effective field strength and gradient across write width WW, providing additional benefits for storage density. In particular, multi-component write pole 46 allows narrower writer structures to function with lower write currents and smaller write gaps (e.g., about 30 to about 45 nm), providing higher R with narrower WPE, a more uniform bit profile across write width WW, and closer track and bit spacing.

In various embodiments with main pole trailing edge width TPWT of about 60 nm, for example, write gap G varies from about 30 to about 45 nm and transverse width FSNW of first shield component 48 varies from about 30 to about 60 nm.

Depending on write current, such tuned configuration yields write width WW between about 58 and about 61 nm, with write-plus erase width WPE between about 75 and about 83 nm. Ratio R varies from about 73% to about 78%, an improvement of up to 8% over the previous single-component write shield designs.

Additional embodiments of multi-component write shield 46 can improve attainable TPI by about 5-10% or about 15-20%, depending upon write gap size and write shield configuration. For first component width FSNW and write gap G of about 30 nm, for instance, the improvement in TPI is about 8% as compared to a single-component write shield design with write gap G≈30 nm, and about 16% as compared to a single-component write shield design with write gap G≈45 nm.

In additional embodiments, with FSNW≈G, ratio R improves by about 3% to about 5% for write gap G≈30 nm, about 5% to about 10% for write gap G≈45 nm, and about 13% to about 16% when write gap G is reduced from 45 nm in the single-component write shield design to 30 nm in the multi-component write shield design. In further embodiments, with FSNW≦2G, ratio R improves by up to 7% for write gap G≈30 nm, up to 10% for write gap G≈45 nm, and up to 15% when write gap G is reduced from 45 nm in the single-component write shield design to 40 nm in the multi-component write shield design.

Figure 5:
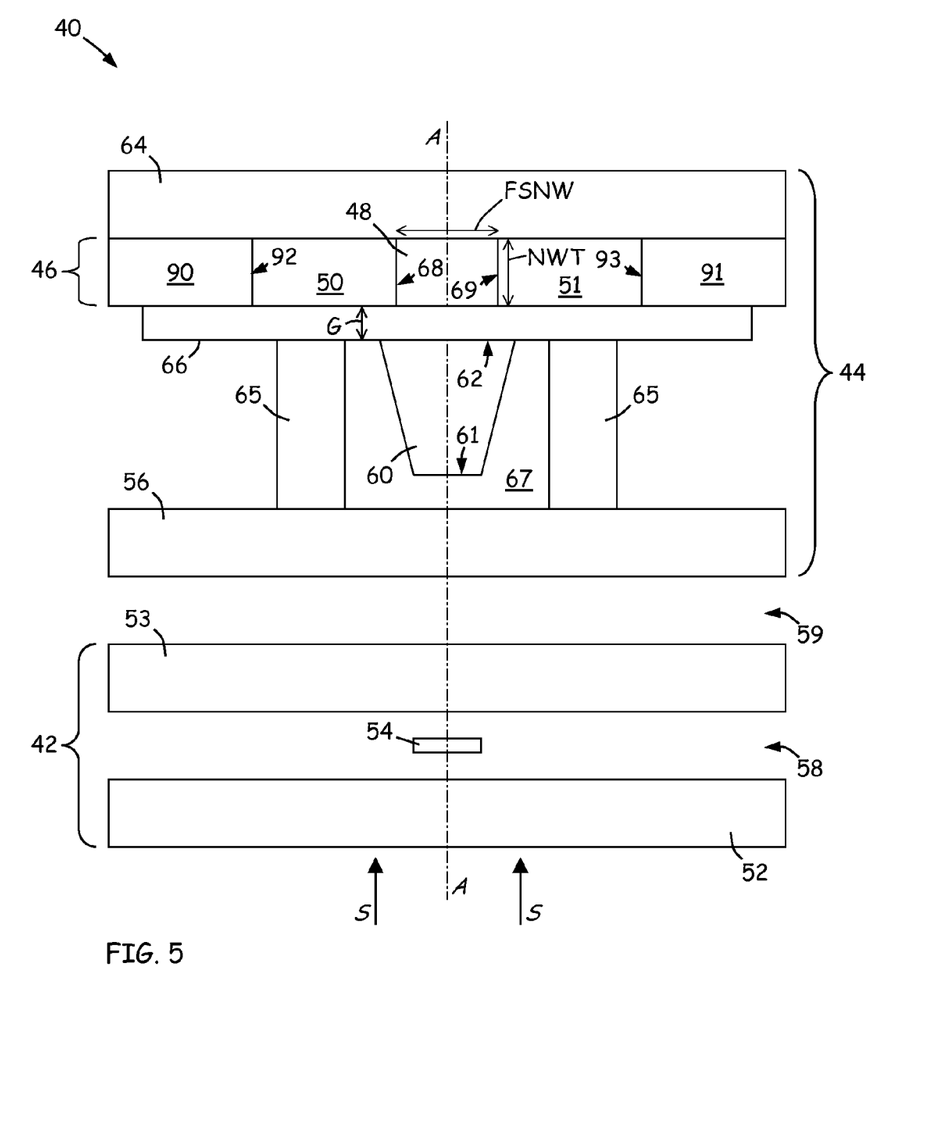
FIG. 5 is an external surface view of an alternate magnetic transducer for the slider in FIG. 1.

FIG. 5 is an external surface view of the exemplary magnetic transducer 40, illustrating an alternate embodiment of writer 44 with multi-component write shield 46. Magnetic transducer 40 is displayed comprising a reader 42 and writer 44 with multi-component shield 46 for performing perpendicular read/write operations on a magnetic medium that translates in tracking direction S, as described above. In the embodiment of FIG. 5, however, multi-component write shield 46 comprises first (center) shield component 48, second (left and right) shield components 50, 51, and third (outrigger) shield components 90, 91.

As shown in FIG. 5, moreover, second (left and right) shield components 50, 51 do not extend behind first (center) shield component 48. This divides multi-component write shield 46 into a number of discrete left-side and right-side pieces.

First (center) shield component 48 is located, as shown in an example embodiment, directly above main pole 60 along center axis A, forming a center shield piece that is spaced from main pole trailing edge 62 by write gap G in write gap layer 66. The second shield components 50, 51 are configured in a non-limiting design spaced from center axis A by first shield component 48, forming left and right shield pieces that extend transversely from opposing sides 68, 69 of first (center) component 48. Third shield components 90, 91 are spaced a predetermined distance from the first component 48 by second (left and right) components 50, 51, forming outriggers that extend transversely from opposing sides 92, 93 of second shield components 50, 51. In further embodiments, fourth, fifth or additional shield components are similarly arranged about third (outrigger) shield components 90, 91.

Third shield components 90, 91 have different magnetic properties from second shield components 50, 51, which can further reduce field curvature and further increase ratio R. This improves the maximum potential TPI and BPI, increasing the attainable packing fraction and areal density over a range of write currents and field strengths. In some embodiments, for example, third shield components 90, 91 are formed the same material as center component 48, or of the same or similar (i.e., non-magnetic) materials as write gap 66. Alternatively, third shield components 90, 91 are formed of a material with magnetic properties that are different from those of both first component 48 and second components 50, 51.

In various embodiments, third shield components 90, 91 are also formed of the same material, such that the left and right outrigger pieces have a symmetric effect. In these embodiments, multi-component shield 46 is sometimes symmetrically arranged about center axis A, as shown in FIG. 5. In other embodiments, however, multi-component shield 46 is asymmetric with respect to the material composition or physical arrangement (or both) of components 48, 50, 51, 90 and 91. In further embodiments, fourth, fifth or additional shield components comprising a range of different magnetic and nonmagnetic materials are also included, utilizing both symmetric and asymmetric configurations.

While this disclosure has been described with reference to particular embodiments, the terminology used is for the purposes of description, not limitation. Workers skilled in the art will recognize that changes may be made in form and detail without departing from the spirit and scope of the technology, including the substitution of various equivalents for particular invention elements and adaptations of the teachings to different materials, situations and circumstances. Thus the present disclosure is not limited to the particular embodiments disclosed herein, but encompasses all embodiments falling within the scope of the appended claims.

The invention claimed is:

1. A writer comprising:
a main pole separated from a write shield by a write gap filled by a first component constructed of a first material, the write shield having a notch aligned about a center axis of the main pole, the notch filled by a second component constructed of a second material, the write shield having a third component constructed of a third material, the first, second, and third components having different magnetic properties, wherein the write gap is disposed between the notch and the main pole.

2. The writer of claim 1, wherein the first and second materials are respectively nonmagnetic materials and the third material is a magnetic material.

3. The writer of claim 2, wherein the second component is symmetrically arranged about the center axis and the third component is symmetrically arranged about the first component and the center axis.

4. The writer of claim 2, wherein the first and second components are formed of a same material.

5. The writer of claim 4, wherein the third component extends behind the second component, opposite the write gap, to enclose the notch in the third component.

6. The writer of claim 2, wherein the write shield reduces field curvature adjacent a trailing edge of the main pole, as compared to a single-component write shield design in which the first component and the second component are formed of a same material.

7. The writer of claim 2, wherein the write shield increases a ratio of useful track width to write-plus-erase width for the writer, as compared to a single-component write shield design in which the first component and the second component are formed of a same material.

8. The writer of claim 1, wherein the write shield further comprises a fourth component having different magnetic properties from the second component, the fourth component extending perpendicularly to the center axis from opposing sides of the second component.

9. The writer of claim 1, wherein the second component has a transverse width that is between one half a trailing edge width of the main pole.

10. The writer of claim 9, wherein the second component has an axial length that is at least as great as a length of the write gap, wherein the length of the write gap is defined along the axis center axis between the write shield and the main pole.

11. A magnetic transducer comprising:
a trailing shield separated from a trailing edge of a write pole by a gap length defined orthogonal to the trailing edge, the gap length filled by a first component, the trailing shield having a notch defined by a trailing notch wall connecting to at least one notch sidewall extending orthogonal to the trailing notch wall, the trailing shield having a second component and the notch occupied by a third component, the first and third components being different nonmagnetic materials and the second component being magnetic.

12. The magnetic transducer of claim 11, wherein the third component has a transverse width between one half a transverse width of the write pole.

13. The magnetic transducer of claim 12, wherein the transverse width of the write pole is 60 nm or less.

14. The magnetic transducer of claim 11, wherein the third component has an axial length as defined within the trailing shield, and wherein the axial length is at least as great as the gap length.

15. The magnetic transducer of claim 14, wherein the gap length is 45 nm or less.

16. The magnetic transducer of claim 11, wherein the second and third components are symmetrically arranged above the write pole, with respect to a tracking direction.

17. The magnetic transducer of claim 11, wherein the third component shapes a field structure proximate the trailing edge of the write pole, such that a linear storage density of the magnetic transducer is increased by at least five percent with respect to a single-component write shield design in which the third component and the second component are formed of the same material.

18. A perpendicular writer comprising:
a write pole separated from a write shield by a write gap filled with a first component constructed of a first nonmagnetic material, the write shield having a notch aligned along a central axis of the write pole between second and third components of the magnetic write shield, the notch occupied by a fourth component, the second and third components constructed of magnetic material while the first and fourth components constructed of different nonmagnetic materials, wherein the write gap is disposed between the notch and the write pole.

19. The perpendicular writer of claim 18, wherein the write pole has a trailing edge width of less than 80 nm and the notch formed in the write shield has a transverse width of at least half the trailing edge width of the write pole.

20. The perpendicular writer of claim 18, wherein the write gap has a length of no more than 45 nm and the notch formed in the write shield has an axial length at least as great as the length of the write gap.

* * * * *